July 27, 1926.
J. G. DAVIS
SILVERED GLOBE AND ITS MOUNTING
Filed Oct. 7, 1924
1,594,245
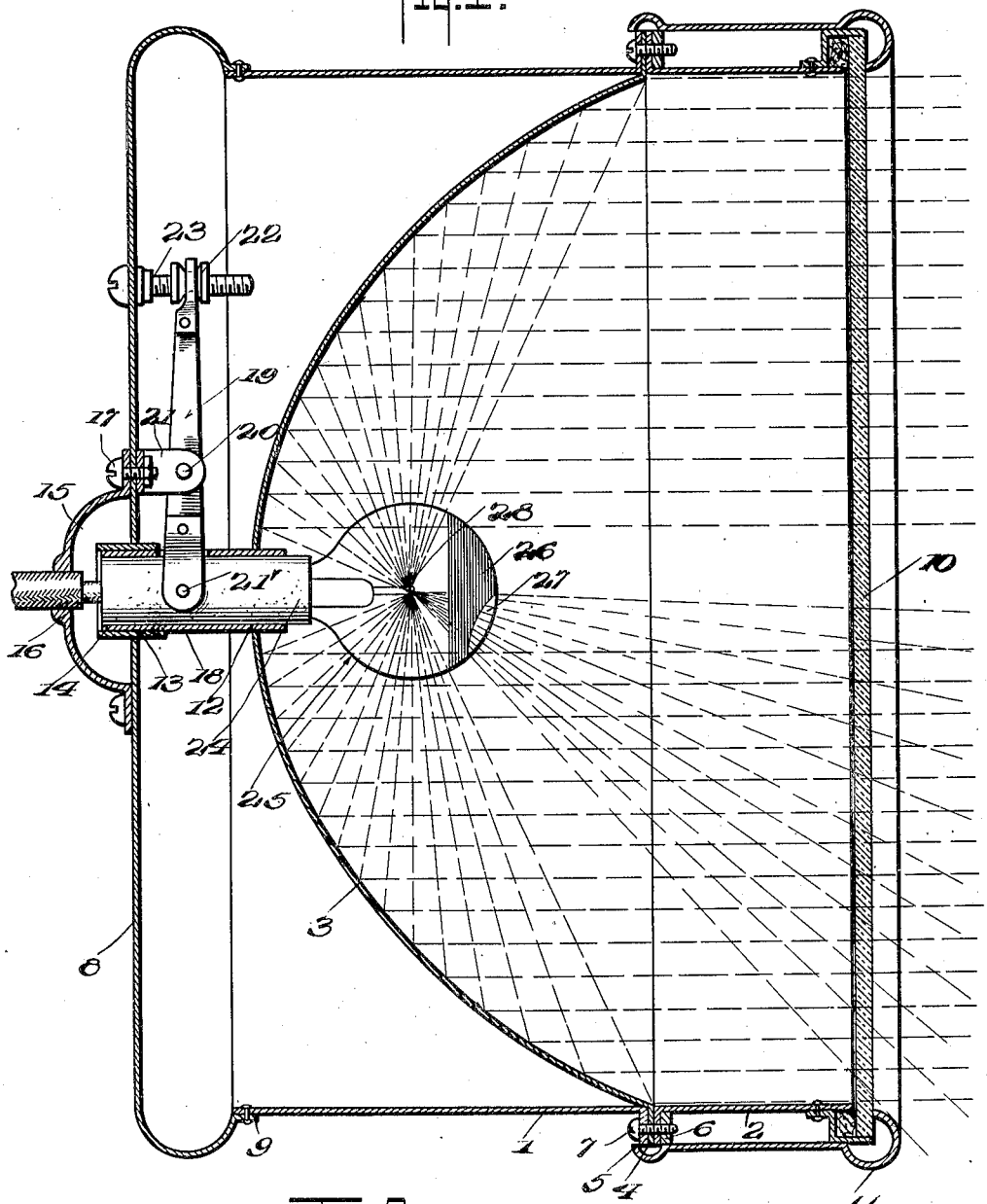
Fig.1.
Fig.2.
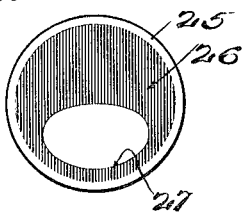
WITNESSES
INVENTOR
JOSEPH G. DAVIS.
BY
ATTORNEYS Patented July 27, 1926.

1,594,245

UNITED STATES PATENT OFFICE.

JOSEPH GEORGE DAVIS, OF DALLAS, TEXAS, ASSIGNOR OF ONE-HALF TO LOUIE L. THALHEIMER, OF DALLAS, TEXAS.

SILVERED GLOBE AND ITS MOUNTING.

Application filed October 7, 1924. Serial No. 742,189.

My invention relates to headlights for vehicles, more particularly to an incandescent lamp having a bulb or globe of a novel construction and means for adjustably supporting the globe in the headlight, and it consists in the combinations, constructions and arrangements herein described and claimed.

An object of the invention is the provision in a headlight having a concavely curved main reflector of a lamp having a globe adapted to cooperate with the main reflector to direct all rays of light from the lamp upon a roadway in advance of the headlight without causing any objectionable glare.

A further object of the invention is to provide an incandescent lamp having a portion of the globe thereof adapted to act as a reflector and to intercept rays of light which otherwise would pass in a substantially straight forward direction from the light emitting element of the lamp.

A further object of the invention is to provide in a headlight an improved means for mounting a lamp of the character described so that the position of the lamp in the headlight can be adjusted to vary the distance which rays of light from the headlight will be projected in advance of the headlight.

Other objects and advantages of the invention will be apparent from the following description, considered in conjunction with the accompanying drawings, forming a part of this application, in which—

Figure 1 is a longitudinal vertical section through a headlight equipped with the invention, Figure 2 is a more or less diagrammatic front view of the improved lamp globe.

In Figure 1, I show a headlight having a casing comprising a body formed of a substantially cylindrical main section 1 and a narrower forward end section 2. A reflector 3 having a concavely curved inner reflecting surface and which may be of parabolic shape has a marginal flange 4 at its mouth clamped between marginal flanges 5 and 6 respectively at the adjacent end of the respective sections 1 and 2 of the body of the casing, the flanges 5, 4, 6 being secured together by fastening devices, such as the screws 7. The section 1 of the headlight casing is closed at its rearward end by an end member 8 having an annular flange 9 overlapping and secured to the rearward end portion of the section 1. A lens 10 covers the forward end of the section 2 and is held against the latter by any suitable known fastening means, such as the rim 11.

The parts described so far may vary considerably in details of construction from those illustrated in the drawings.

The reflector 3 is provided with an opening 12 in the back portion thereof in line with an opening 13 in the end member 8. A bushing 14 may be secured in the opening 13 and a cap 15 having a central opening 16 in line with the openings 12 and 13 may be secured by nuts and bolts indicated generally at 17 to the end member 8 in position to loosely cover the opening 13. A sleeve 18 is partially received in the bushing 14 and extends through the opening 12 into the reflector 3. The outer end portions of both the sleeve 18 and the bushing 14 extend beyond the outer end of the opening 13 into the space between the cap 15 and the end member 8. A substantially vertical supporting and adjusting lever 19 is supported intermediate its ends on a horizontal pivotal element 20 which is carried by a bracket 21. The latter is secured to the end member 8 within the headlight casing by fastening means which may be one of the bolt and nut arrangements 17. The lever 19 is connected at its lower end to the sleeve 18, as at 21'. The lever 19 loosely supports a nut 22 which is threadedly engaged by an adjusting screw which extends through an opening in the end member 8 and is rotatable in said opening but is not permitted to move axially relatively to the end member 8.

The sleeve 18 carries a socket 24 which protrudes therefrom into the space within the reflector 3. The socket 24 supports an electric lamp having a novel globe 25 which will be described in detail hereinafter, the globe thus being supported within the reflector 3. The sleeve 18 has limited movement in the opening 12 and the bushing 14. Swinging movement of the sleeve 18 may be effected by turning the adjusting screw 23 to cause swinging of the lever 19 and consequent movement of the lamp in the space within the reflector 3.

The globe 25 of the lamp is silvered externally at the front as indicated at 26 except for a portion 27 which is unsilvered and translucent or transparent. The portion 27 does not extend above the level of the horizontal median line of the globe and may be of any desired configuration, preferably being substantially elliptical and flattened slightly at its upper side as shown in Figure 2. The inner surface of the silvered portion 26 thus forms a concave reflector which has the marginal edge thereof located in a vertical plane extending transversely of the globe 25 forwardly of the filament 28 of the lamp, the latter being located centrally of the globe and at the level of the upper side of the unsilvered portion 27. The portion of the lamp globe 25 which extends between the marginal line of the silvered portion 26 and the base of the lamp also is unsilvered and transparent or translucent.

From the foregoing description of the various parts of the device, the operation thereof may be readily understood. Certain of the rays of light from the filament 28 pass directly through the unsilvered portion 27 of the globe forwardly and downwardly thus causing a beam of light of greater width than length on the roadway. Other rays of light strike the reflecting inner surface of the silvered portion and are reflected onto the main reflector 3 and thence onto the roadway together with the remaining rays of light from the filament which pass directly to the reflector 3 and thence to the roadway. Practically all the rays of light thus are utilized in lighting the roadway. The silvered portion of the globe intercepts the rays of light which would pass in an upwardly inclined or horizontal direction direct from the lamp and no glare will be caused because of the utilization of all the rays of light from the filament in the illumination of the roadway. The rays of light passing directly from the lamp through the unsilvered portion 27 of the globe will illuminate the roadway directly at the front of a vehicle equipped with the headlight and forwardly of the vehicle until such direct rays of light are merged into the beam which is reflected onto the roadway by the reflector 3.

The extent of illumination of the roadway forwardly of the vehicle can be varied by manipulating the adjusting screw 23 to vary the position of the globe of the lamp in the reflector.

Obviously, the invention is susceptible of embodiment in forms other than that which is illustrated in the accompanying drawings and I therefore consider as my own all such modifications and adaptations thereof as fairly fall within the scope of the appended claims.

I claim:

1. In combination, a concave reflector, and an incandescent lamp supported within the reflector, said lamp comprising a globe and a filament located within the globe centrally thereof, said globe being translucent completely around the globe from the end thereof proximate to the reflector for more than half the length of the globe, the remaining portion of the globe comprising a second translucent portion located below the level of the filament, and an externally silvered portion extending between the first and second named translucent portion, the second named translucent portion being substantially elliptical in configuration with the major axis thereof horizontal.

2. In combination, a concave reflector, and an incandescent lamp supported within the reflector, said lamp comprising a globe and a filament located within the globe centrally thereof, said globe being translucent from the end thereof proximate to the reflector for more than half the length of the globe, the remaining portion of the globe comprising a second translucent portion located below the level of the filament, and an externally silvered portion extending between the first and second named translucent portion, said second translucent portion being substantially elliptical in configuration with the major axis thereof horizontal and with upper side thereof slightly flattened.

3. In a headlight, an incandescent lamp comprising a globe and a source of light within the globe, said globe having an opaque portion in front of the source of light and having a translucent portion completely surrounded by said opaque portion and located below the level of the source of light, said translucent portion being substantially elliptical in configuration with the major axis thereof horizontal.

4. In a headlight, an incandescent lamp comprising a globe and a source of light within the globe, said globe having an opaque portion in front of the source of light and having a translucent portion completely surrounded by said opaque portion and located below the level of the source of light, said translucent portion being substantially elliptical in configuration with the major axis thereof horizontal, said globe being translucent completely around the globe from the edge of said opaque portion to the base of the lamp.

JOSEPH GEORGE DAVIS.